Dec. 17, 1963    P. P. STEINLE    3,114,311
BEARING SUPPORT FOR AN ECCENTRIC DRIVEN POWER PRESS
Filed May 13, 1963    2 Sheets-Sheet 2
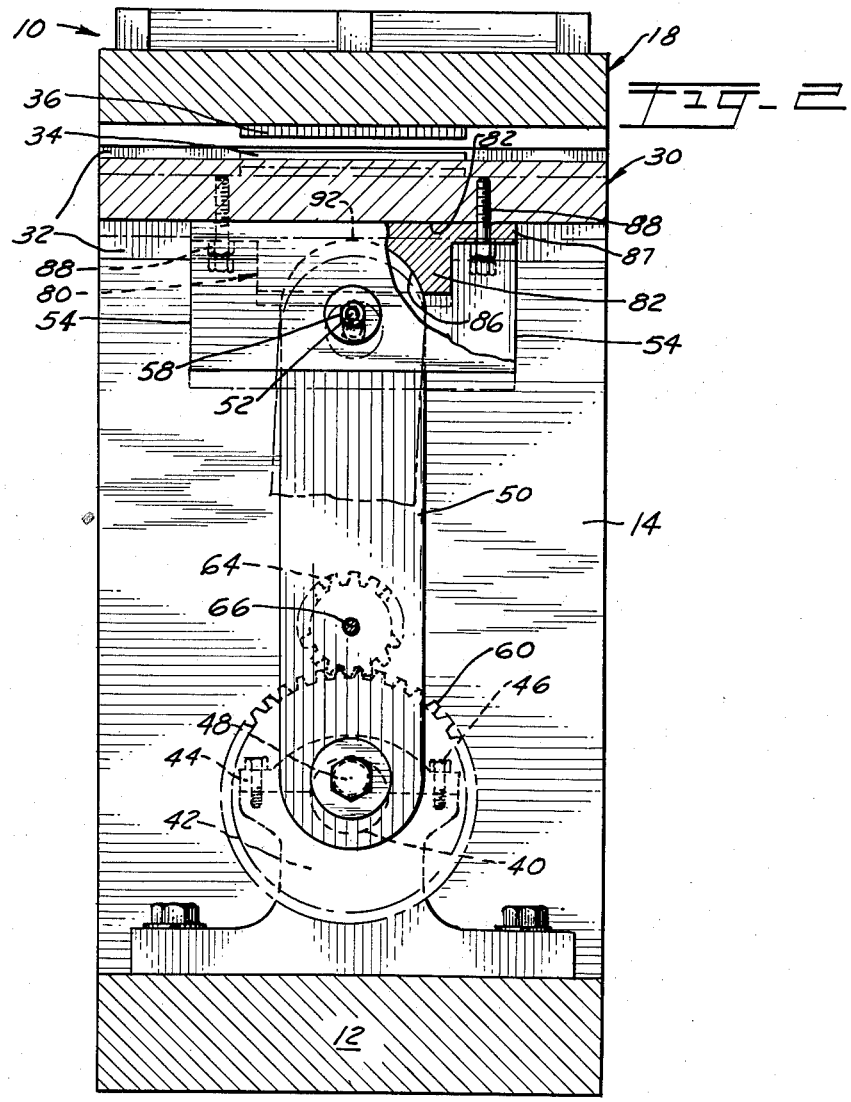
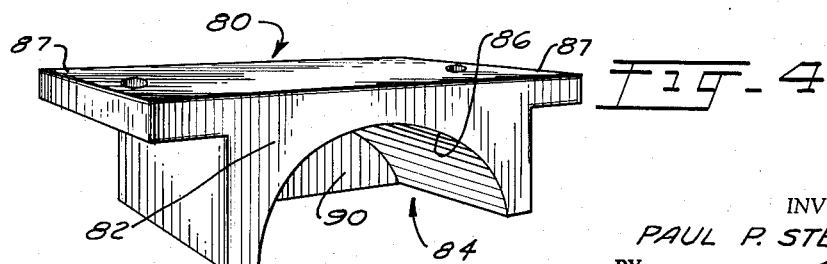
INVENTOR.
PAUL P. STEINLE
BY
ATTORNEY 3,114,311
BEARING SUPPORT FOR AN ECCENTRIC DRIVEN
POWER PRESS
Paul P. Steinle, 5817 N. Kenmore Ave., Chicago, Ill.
Filed May 13, 1963, Ser. No. 279,912
5 Claims. (Cl. 100—292)

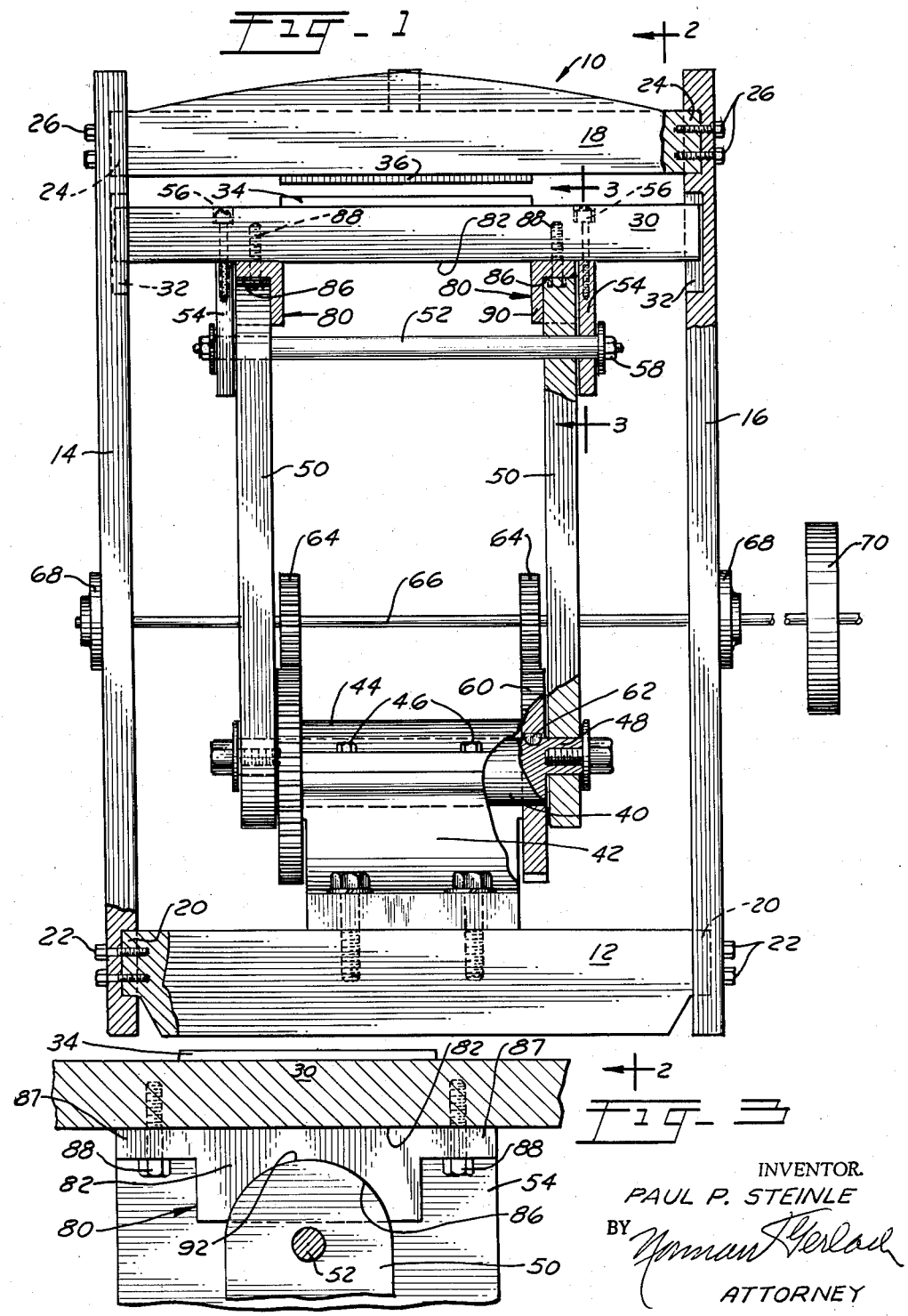

The improved bearing support comprising the present invention has been designed for use primarily in connection with an eccentric operated power press or the like of the type wherein a reciprocating platen which is adapted to have forming, extruding, shearing, creasing, or other material working dies or tools attached thereto derives its motion from a rotary crankshaft or other eccentric means which drives the platen through a pitman or connecting rod.

The principal object of the invention is to provide a new and improved press or the like of the above-mentioned character having associated therewith novel means for translating the oscillatory and vertical movements of the connecting rod into linear reciprocation of the movable platen, such means serving to distribute the thrust of the connecting rod to the platen over a wider area than has heretofore been possible in connection with a conventional or standard present-day press. In carrying out this object, the invention contemplates the provision of a simple and novel, one-piece, block-like bearing support which is adapted to be interposed between the underneath face of the platen of the press and the adjacent or upper end of the oscillatory and reciprocating connecting rod, the bearing support making wide area contact with the underneath face of the platen and also having a downwardly presented curved bearing surface, the adjacent end of the connecting rod being conformably shaped or curved and fitting against the curved bearing surface in such a manner that the upper end of the connecting rod may rock within or upon the bearing surface, while at the same time, transmitting upward thrust to the bearing support and effecting a consequent upward displacement thereof for effecting the upstroke of the platen.

The provision of an eccentric operated or driven power press which is extremely rugged and durable and, therefore, will operate over long periods of sustained use without requiring attention or adjustment; one which is relatively simple in its design so that it may be manufactured at a low cost; one which is possessed of a minimum number of moving parts and, therefore, is unlikely to get out of order; one which is capable of ease of assembly and dismantlement for purposes of inspection of parts, replacement, or repair thereof; and one which otherwise is well-adapted to perform the services required of it, are further desirable features which have been borne in mind in the production and development of the present invention.

In the accompanying two sheets of drawings forming a part of this specification, one illustrative embodiment of the invention has been shown.

In these drawings:

FIG. 1 is a front elevational view, partly in section, of a power press constructed in accordance with the principles of the present invention;

FIG. 2 is a vertical sectional view taken on the line 2—2 of FIG. 1;

FIG. 3 is an enlarged sectional view taken on the line 3—3 of FIG. 1 and illustrating in detail the construction and design of the novel bearing supports of the press; and FIG. 4 is a perspective view of one of two bearing supports which are employed in connection with the present invention.

Referring now to the drawings in detail, and in particular to FIGS. 1 and 2, there is illustrated therein a power press 10 including a lower horizontally extending base member 12 from which there extends upwardly on opposite sides thereof a pair of side plates 14 and 16, the upper ends of the side plates being connected together by a stationary crosshead 18. The ends of the lower base member 12 are set in recesses 20 in the lower ends of the side plates 14 and 16 and are fixedly secured in place by way of bolts 22. Similarly, the ends of the stationary crosshead 18 are set in recesses 24 in the upper ends of the side plates 14 and 16 and are fixedly secured in place by means of bolts 26. The base member 12, the side plates 14 and 16, and the crosshead 18 constitute, in effect, an open-sided rectangular press framework within which the hereinafter described various movable press instrumentalities are operatively installed. All of the aforesaid framework parts are fabricated of heavy iron or steel and thus form an extremely strong and rigid framework.

A vertically reciprocable tool-carrying platen 30 extends horizontally between the side plates 14 and 16 and has its ends slidable in opposed recesses 32 in the side plates. The upper face of the platen 30 is adapted to carry one or more suitable tools, such as shearing, blanking, punching, folding, creasing dies, or the like, one such tool being illustrated in position on the platen 30 and designated by the reference numeral 34. The underneath or bottom face of the crosshead 18 is adapted to carry one or more complemental tools for cooperation with the tool or tools on the platen 30, one such tool being designated by the reference numeral 36. It will be seen that upon vertical reciprocation of the platen 30, the tool 34 will be moved into and out of cooperating engagement with the tool 36 in the usual manner of press operation.

The eccentric drive for reciprocating the platen 30 includes a horizontally extending shaft 40 which is journalled in a bearing assembly including a pillow block 42 and a bearing cap 44 which is connected to the pillow block by means of bolts 46. The ends of the shaft 40 are formed with cylindrical eccentrics 48 which project outwardly beyond the confines of the bearing assembly (42, 44) and are connected to the lower ends of upstanding connecting rods 50. A horizontal cross shaft 52 extends between, and projects through holes in, the upper end regions of the connecting rods 50 and has its extremities pivotally connected to a pair of combined attachment and reaction plates 54 which depend from the underneath face of the vertically movable platen 30 and are secured in position by means of screws 56. Bolt and washer assemblies 58 on the ends of the cross shaft 52 is loosely carried in the upper ends of the connecting rods 50 and also in the plates 54 so that it is freely rotatable with respect to these members although it is within the purview of the invention that the shaft may be fixedly secured in either the upper ends of the connecting rods 50 or in the plates 54, but not in both the connecting rods and the plates.

The ends of the shaft 40 which project outwardly beyond the bearing assembly (42, 44) and carry the eccentrics 48 are provided with relatively large gears 60 which are keyed to the shaft as at 62 and mesh with smaller gears 64 on a horizontal drive shaft 66. The latter projects across the framework between the side plates 14 and 16 and is rotatably journalled in bearing aasemblies 68 which are suitably carried on the side plates 14 and 16, respectively. The drive shaft 66 carries a flywheel 70 exteriorly of the framework and may be driven from a power source by any suitable drive or transmission means such as are well-known to those skilled in the art to which the invention pertains and which, therefore, will not be described further herein other than to say that the press 10 embodying the invention is capable of being driven conveniently either through conventional continuously running drive mechanism or through conventional onerevolution clutch and brake means. In the latter instance, the flywheel 70 will, ordinarily, be omitted.

From the above description, it will be seen that upon rotation of the shaft 66, the eccentrics 48 will travel in circular paths and cause the usual rocking and reciprocatory motion to the connecting rods 50 and the upper ends of these connecting rods will, in the absence of any other connecting means between the connecting rods and the movable platen 30, transmit their motion to the platen through the attachment and reaction plates 54 through the medium of the horizontal shaft 52. The attachment and reaction plates 54, being affixed to the platen 30, will cause the latter to reciprocate vertically in the recesses 32 in the inside faces of the side plates 14 and 16.

According to the present invention, and in order to transmit more effectively the upward thrust of the connecting rods 50 to the vertically reciprocable platen 30 and over a comparatively wide area, two bearing supports 80 are provided, and these supports have portions thereof interposed between the extreme upper ends of the connecting rods 50 and the underneath face of the platen 30. The two bearing supports 80 are substantially identical in design and construction and, therefore, a description of one of them will suffice for them both.

Each bearing support 80 comprises an integral one-piece member which may be in the form of a machined casting including a generally rectangular block-like body portion 82, the underneath side of which is provided with an arcuate recess 84 affording a semi-cylindrical bearing surface 86, the arcuate extent of which is slightly less than 180°. The upper end of the bearing support 80 is provided with lateral attachment flanges 87 which are fixedly secured by means of screws 88 to the underneath face 82 of the vertically movable platen 30. A flat side wall 90 in the form of a web is provided on the inner side of the arcuate recess 84 so that the recess opens sidewise onto only one side face of the bearing support, i.e., the side face remote from the side wall 90. The transverse width of the arcuate bearing surface 86 is substantially equal to the thickness of the associated connecting rod 50 and the extreme upper end of each connecting rod is curved as at 92 on a radius equal to the radius of curvature of the associated arcuate bearing surface 86 so that the upper end of the connecting rod fits into the arcuate recess 84 in the manner illustrated in FIGS. 2 and 3 with the upper end of the connecting rod being centered in the recess between the depending side wall 90 and the adjacent attachment and reaction plate 54 when the bearing support is secured in position on the underneath face of the vertically movable platen 30. When thus in position within the arcuate recess 84 of the bearing support 80, the curved upper end of the connecting rod accurately mates with the arcuate bearing surface 86 so that, as the connecting rod 50 gyrates incident to the action of the associated eccentric 48 to which its lower end is connected, the upper end thereof will rock within the arcuate recess 84, while at the same time, such vertical components of movement as are involved at the upper end of the connecting rod 50 will be translated into corresponding vertical reciprocation of the bearing support and thus to the vertically movable platen 30 to which it is secured.

Since two bearing supports 80 are provided, one at the upper end of each connecting rod 50, the upward thrust which is assimilated by these two bearing supports is distributed over a fairly wide area on the underneath face of the vertically movable platen 30, thus eliminating the necessity of employing a relatively thick and heavy platen to avoid platen deformation when the tools 34 and 36 are operating upon the work. Similarly, the use of the bearing supports 80 of the present invention eliminates the necessity of employing a cross shaft, such as the shaft 52, of large diameter since by the use of the bearing blocks, shearing forces acting upon the shaft are completely eliminated at low press speeds where there is a tendency for the platen to move downwardly solely under the influence of the involved gravitational forces. At high press speeds, the only shearing stress which is placed upon the shaft 52 is that which is involved when the shaft is obliged to pull the reaction plates 54 downwards and thus lower the platen 30. The consequent reduction in the involved reciprocating and oscillating mass permits operation of the press at relatively high speeds with a minimum of wear and vibration. At higher operating speeds, a shorter eccentric stroke may be employed such as illustrated herein.

The invention is not to be limited to the exact arrangement of parts shown in the accompanying drawings or described in this specification as various changes in the details of construction may be resorted to without departing from the spirit or scope of the invention. For example, while the operative press instrumentalities have been illustrated and described herein as being housed within a generally rectangular frame-like structure including flat side plates which are recessed to provide guideways for the vertically reciprocable platen, the basic framework design may be altered appreciably and if desired the movable platen may be guided upon vertically extending columns or shafts which project upwardly from the base member while the opposite ends of the platen may be provided with suitable sleeves or bushings which are slidable on the columns. In such an instance, the stationary crosshead will be connected to the columns or vertical shafts by suitable collars which may be anchored on the columns or shafts by set screws or the like. Therefore, only insofar as the invention has been particularly pointed out in the accompanying claims is the same to be limited.

Having thus described the invention what I claim as new and desire to secure by Letters Patent is:

1. In a power press of the character described, a base member, spaced side supports projecting upwardly from said base member, a crosshead extending between the upper ends of said supports, a vertically reciprocable platen extending between said supports and slidable thereon for movement toward and away from the crosshead, cooperating tools carried by the crosshead and platen respectively, a shaft bearing mounted on said base member, a shaft rotatably journalled in said shaft bearing, an eccentric on said shaft, an upstanding connecting rod pivotally connected at its lower end to said eccentric and pivotally connected at its upper end to the platen for translating rotary movement of the shaft into reciprocation of the platen, a bearing support interposed between the extreme upper end of the connecting rod and the platen, said bearing support being fixedly secured to the platen and presenting a downwardly facing bearing surface which rests upon the upper end of the connecting rod and against which said upper end of the connecting rod is slidable, and power means for rotating said shaft.

2. In a power press of the character described, a base member, spaced side supports projecting upwardly from said base member, a crosshead extending between the upper ends of said supports, a vertically reciprocable platen extending between said supports and slidable thereon for movement toward and away from the crosshead, cooperating tools carried by the crosshead and platen respectively, a shaft bearing mounted on said base member, a shaft rotatably journalled in said shaft bearing, an eccentric on said shaft, an upstanding connecting rod pivotally connected at its lower end to said eccentric and pivotally connected at its upper end to the platen for translating rotary movement of the shaft into reciprocation of the platen, the extreme upper end of the connecting rod above the level of the point of pivotal connection between the connecting rod and the platen presenting an upwardly facing semi-cylindrical supporting surface, a bearing support interposed between said semi-cylindrical supporting surface and the platen, said bearing support being secured to the platen and presenting a downwardly facing semi-cylindrical bearing surface conformable in contour to the contour of the semi-cylindrical supporting surface on the connecting rod, said bearing surface being slidably supported upon said supporting surface, and means for rotating said shaft.

3. In a power press of the character described, a base member, spaced side supports projecting upwardly from said base member, a crosshead extending between the upper ends of said supports, a vertically reciprocable platen extending between said supports and slidable thereon for movement toward and away from the crosshead, cooperating tools carried by the crosshead and platen respectively, a shaft bearing mounted on said base member, a shaft rotatably journalled in said shaft bearing, an eccentric on said shaft, a combined attachment and reaction plate secured to the lower face of said platen and depending therefrom, an upstanding connecting rod pivotally connected at its lower end to the eccentric and pivotally connected at its upper end to said combined attachment and reaction plate, the extreme upper end of said connecting rod above the point of pivotal connection of the connecting rod to the combined attachment and reaction plate presenting an upwardly facing semi-cylindrical bearing surface, a bearing support interposed between said semi-cylindrical supporting surface and the lower face of the platen, said bearing support being in the form of a solid block of bearing material, having a flat upper face fitting against the underneath face of the platen and having a lower face provided with a recess therein presenting a semi-cylindrical bearing surface conformable in contour to the contour of the semi-cylindrical surface on the connecting rod, said semi-cylindrical surfaces mating with each other in sliding relationship whereby upon movement of the connecting rod, the upper end thereof will rock within said recess, and means for rotating said shaft.

4. In a power press of the character described, a base member, spaced side supports projecting upwardly from said base member, a crosshead extending between the upper ends of said supports, a vertically reciprocable platen extending between said supports and slidable thereon for movement toward and away from the crosshead, cooperating tools carried by the crosshead and platen respectively, a shaft bearing mounted on said base member, a shaft rotatably journalled in said shaft bearing, an eccentric on said shaft, a combined attachment and reaction plate secured to the lower face of said platen and depending therefrom, an upstanding connecting rod pivotally connected at its lower end to the eccentric and pivotally connected at its upper end to said combined attachment and reaction plate, the extreme upper end of said connecting rod above the point of pivotal connection of the connecting rod to the combined attachment and reaction plate presenting an upwardly facing semi-cylindrical bearing surface, a bearing support interposed between said semi-cylindrical bearing surface and the lower face of the platen, said bearing support being in the form of a solid block of bearing material, having a flat upper face fitting against the underneath face of the platen, having one side face fitting against the combined attachment and reaction plate, and having a lower face provided with a recess therein presenting a semi-cylindrical bearing surface conformable in contour to the contour of the semi-cylindrical bearing surface on the upper end of the connecting rod, said recess opening sidewise onto said one side face, the upper end of said connecting rod projecting into said recess and having its semi-cylindrical bearing surface in sliding engagement with the first mentioned semi-cylindrical bearing surface and having a side face thereof in sliding engagement with said combined attachment and reaction plate, and means for rotating said shaft.

5. In a power press of the character described, a base member, spaced side supports projecting upwardly from said base member, a crosshead extending between the upper ends of said supports, a vertically reciprocable platen extending between said supports and slidable thereon for movement toward and away from the crosshead, cooperating tools carried by the crosshead and platen respectively, a shaft bearing mounted on said base member, a shaft rotatably journalled in said shaft bearing, an eccentric on said shaft, a combined attachment and reaction plate secured to the lower face of said platen and depending therefrom, an upstanding connecting rod pivotally connected at its lower end to the eccentric and pivotally connected at its upper end to said combined attachment and reaction plate, the extreme upper end of said connecting rod above the point of pivotal connection of the connecting rod to the combined attachment and reaction plate presenting an upwardly facing semi-cylindrical bearing surface, a bearing support interposed between said semi-cylindrical bearing surface and the lower face of the platen, said bearing support being in the form of a solid block of bearing material, having a flat upper face fitting against the underneath face of the platen, having one side face fitting against the combined attachment and reaction plate, and having a lower face provided with a recess therein presenting a semi-cylindrical bearing surface conformable in contour to the contour of the semi-cylindrical surface on the upper end of the connecting rod, said recess opening sidewise onto said one side face, a flat reaction web extending across said recess on the side of the second mentioned bearing surface remote from said one side face, the upper end of said connecting rod projecting into said recess between said combined attachment and reaction plate and the reaction web and being confined therebetween, said connecting rod having its semi-cylindrical bearing surface in sliding engagement with the semi-cylindrical bearing of the bearing support, and means for rotating said shaft.

References Cited in the file of this patent

UNITED STATES PATENTS

| | | |
|---|---|---|
| 1,905,113 | Lasker | Apr. 25, 1933 |
| 2,636,433 | Wennberg | Apr. 28, 1953 |
| 2,652,770 | Wilkins | Sept. 22, 1953 |